United States Patent
Blaauw

[15] 3,645,368
[45] Feb. 29, 1972

[54] BRAKE OPERATED TRANSMISSION NEUTRALIZER

[72] Inventor: Andrew Blaauw, Winneconne, Wis.
[73] Assignee: J. I. Case Company, Racine, Wis.
[22] Filed: Oct. 26, 1970
[21] Appl. No.: 83,752

[52] U.S. Cl. .............................. 192/4 C, 192/4 B, 74/470, 74/481, 251/289, 251/294
[51] Int. Cl. .................................................. B60k 29/02
[58] Field of Search .................................. 192/4 A, 4 B, 4 C

[56] References Cited

UNITED STATES PATENTS

| | | | |
|---|---|---|---|
| 2,812,837 | 11/1957 | Khan | 192/4 A |
| 3,349,860 | 10/1967 | Ross | 192/4 B X |
| 3,539,040 | 11/1970 | Edwards | 192/4 B |

Primary Examiner—Benjamin W. Wyche
Attorney—Cullen, Settle, Sloman & Cantor

[57] ABSTRACT

A vehicle which has a transmission having forward and reverse control means in which the forward and reverse control means is connected to a bracket member on the manual control lever to shift the transmission from neutral to forward or reverse; the vehicle is further equipped with a brake mechanism actuated by a pivoted brake pedal which is connected by means of a return spring to the bracket member attached to the control lever; the spring normally tends to constantly urge the control lever in the neutral position; when in tension a lost motion connection is provided between the spring and the bracket member to allow the bracket member to be pivoted by shifting of the direction control lever without loading the spring; the mechanism functions such that, when the brake is applied, the lost motion connection is taken up and the spring is tensioned causing the direction control lever to return to neutral; the spring and the bracket member on the control lever further provides an override means permitting the tractor transmission to be shifted into forward or reverse before the brake is released by stretching the spring to obtain vehicle motion prior to complete brake release.

9 Claims, 3 Drawing Figures

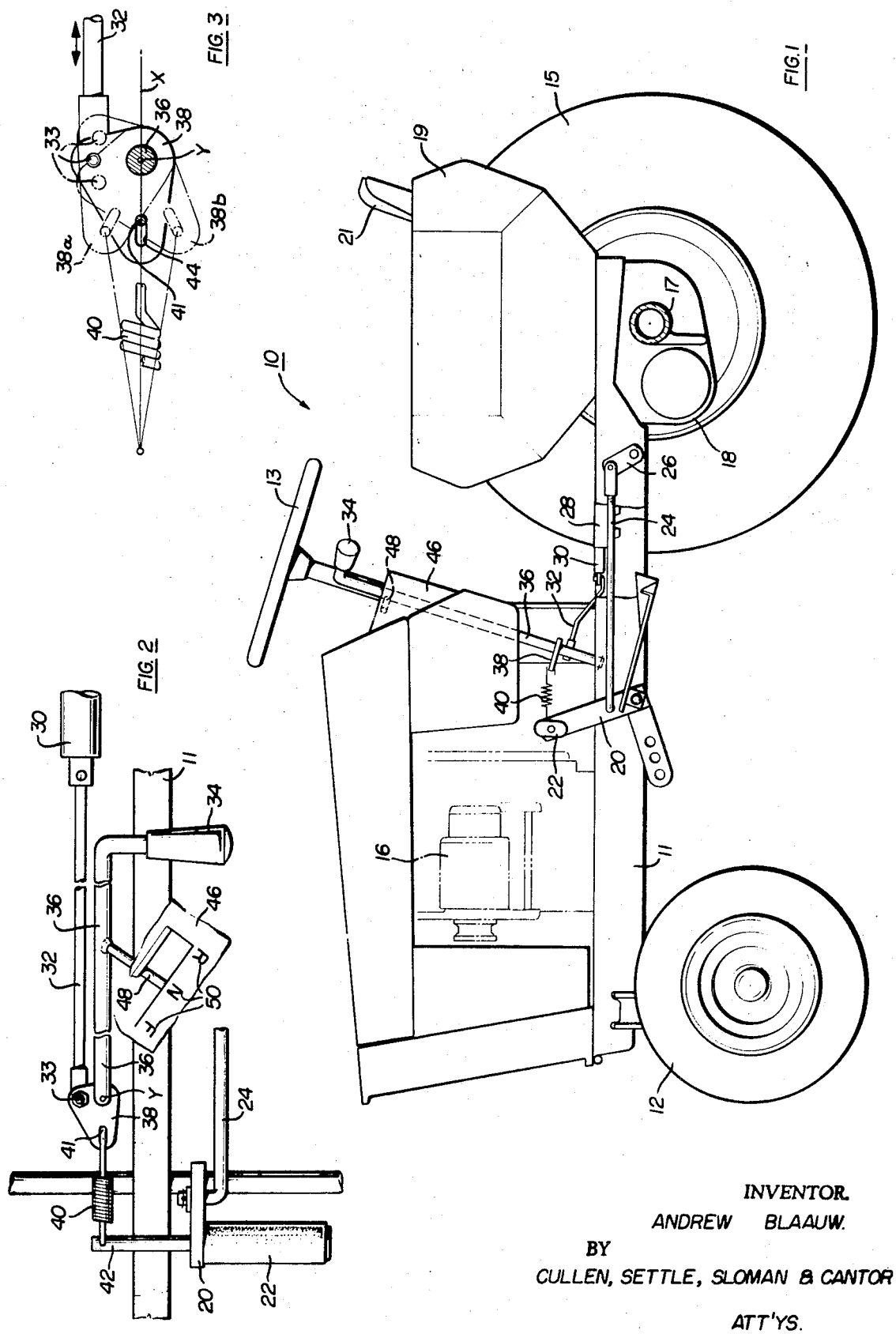

BRAKE OPERATED TRANSMISSION NEUTRALIZER

BACKGROUND AND SUMMARY OF THE INVENTION

The present invention relates in general to vehicle transmission control mechanisms and more in particular to a combined transmission and brake control mechanism for a vehicle.

In vehicles employing a hydrostatic transmission, as the torque transmitting driving force for the traction wheels of the vehicle, it is highly desirable that the transmission be shifted to a neutral position prior to braking of the traction wheels of the vehicle so as to avoid braking against engine power transmitted to the traction wheels by means of the hydrostatic transmission. It is conventional practice to provide manually operable control mechanisms for controlling the output of the drive pump of the hydrostatic transmission as well as the directional fluid flow in order to control directional movement of the vehicle. These control mechanisms are arranged such, as to require mechanisms to put the transmission into neutral before applying the vehicle brakes. In instances where the operator of the vehicle fails to actuate the directional control mechanism for any reason whatsoever, or in the event of an emergency where there is no time to affect manual actuation of the control mechanism, the operator will brake the vehicle motion against the engine power transmitted to the hydrostatic transmission, resulting in damage to the transmission as well as stalling of the engine.

It has been proposed herebefore to provide an integrated mechanism between the directional control mechanism and the brake mechanism of the vehicle to cause automatic return of the directional control mechanism to the neutral position to disconnect the transmission from the traction wheels when the brake mechanism is actuated. However, in these known arrangements, no effective means have been provided to permit actuation of the direction control mechanism prior to release of the brakes in order to provide tractive power to the traction wheels of the vehicle before complete release of the brakes, which is highly desirable in starting movement of the vehicle on a hillside to prevent the vehicle from rolling downwardly when the brakes are released. Thus, in the known mechanisms of this kind, the vehicle directional control mechanisms are locked in neutral and remain in neutral as long as the brakes are applied, permitting shifting into forward or reverse only after complete release of the brakes.

The present invention provides an improved mechanism of the type which interconnects the transmission directional control mechanism with the brake actuating mechanism of the vehicle in such fashion as to permit shifting of the directional control mechanism prior to complete release of the brakes.

Accordingly, the primary object of the present invention is to provide an improved means for coupling the brake actuating mechanism of the vehicle with the directional control mechanism of the vehicle transmission, such that, upon actuation of the brake mechanism the transmission of the vehicle will be automatically returned to neutral and wherein the interconnecting means incorporates a tension spring connection permitting the directional control mechanism to be shifted in a selective drive position prior to release of the brake mechanism to prevent runaway of the vehicle.

The present improved mechanism includes a manual control lever for selective directional control of the transmission of the vehicle, which has a bracket member attached thereto for pivotal movement with the control lever around an axis. The bracket member is attached to a control linkage which is connected to the shift actuator of the transmission so that by selective positioning of the control lever, the actuator will be positioned to cause rotation of the transmission in the respective direction. The bracket member of the control lever is further connected to the bracket member of the end of the brake pedal return spring, the other end of which is connected to the brake pedal of the vehicle, which is operable to retain the bracket member, and thus the control lever, in a neutral position. The return to neutral spring is connected to the bracket member of the control lever by means of a lost-motion connection to permit actuation of the directional control mechanism prior to the engagement of the brake mechanism without having a reactive force from the spring.

The foregoing objects and advantages and other novel features of the present invention will become more fully apparent by reference to the following detailed description of a preferred embodiment of the invention as illustrated on the attached sheet of drawings.

BRIEF DESCRIPTION OF THE DRAWINGS

The accompanying drawings illustrates a preferred embodiment of the invention in which:

FIG. 1 is a side elevation of a vehicle in which the present invention is embodied for illustrating purpose;

FIG. 2 is an enlarged top plan view of the present improved interrelated control mechanism shown in the neutral position; and FIG. 3 is a schematic, further enlarged illustration of the functional characteristic of the present improved interrelated control mechanism.

DESCRIPTION OF THE PREFERRED EMBODIMENT

With reference to the attached drawings hereof, it will be seen that the present invention, for example, is depicted as being incorporated in a tractor vehicle, generally indicated by the reference numeral 10, including a frame 11 supported on front mounted steerable wheels 12 (only one of which is shown) steerable by means of a steering wheel 13 conventionally connected by a linkage to the front wheels 12.

The rear end of the frame 11 is supported on traction wheels 15 (only one of which is shown), which are conventionally drivingly connected to the prime mover 16 of the tractor 10 for rotation around an axle 17. The rear end of the frame 11 further supports an operator station 19 including a seat 21.

The traction wheels 15 are driven from the engine 16 by means of a transmission indicated at 18 which may be a hydrostatic unit transmission to drive the traction wheels at various selective speed ranges in forward or reverse direction.

The traction wheels 15, as is customary, are provided with brakes (not shown) actuated by foot operated brake linkage which includes a lever 20 pivoted at its lower end to the frame 11 and provided at the upper end with a brake pedal 22. The lever 20 is connected by means of a brake rod 24 to the customary brake actuating lever 26 so that upon pressure on the foot pedal 22, the lever 20 will be pivoted to move the brake rod 24 longitudinally which pivots the brake actuating lever 26 for application of the brakes in customary fashion.

The transmission 18 is selectively rotatable in either forward or reverse direction provided for by respective positioning of a direction positioning valve 28 which has a valve actuating stem 30 for connection to a link member 32. The directional positioning valve 28 is actuated by means of a manual control lever 34 disposed within reach of the operator of the tractor, which is attached to the upper end of a pivot shaft 36 suitably supported for pivoting movement within the tractor housing. The lower end of the pivot shaft 36 of the control lever 34 is provided with a pivot member 38 in the form of a bracket, attached thereto for rotation with the pivot shaft when the control lever is manipulated.

AS seen in FIGS. 2 and 3, the bracket like pivot member 38 is shaped substantially triangular in plan view with one apex being attached to the control lever shaft 36 for pivotal rotation of the pivot member 38 with the control lever shaft 36 when the control lever is manipulated. The other end of the link member 32 of the directional positioning valve 28 is pivotally connected at 33 to another apex of the pivot member 38 adjacent the pivot shaft connection. The third apex of the triangular shaped pivot member 38, forwardly of the control lever pivot shaft 36 and normally in linear alignment therewith, is connected to one end of a brake pedal return spring 40 which other end is connected to an arm extension 42 of the brake pedal 22 such, that the longitudinal axis "X" of the spring 40 normally, that is in neutral position of the control lever 34, is in linear alignment with and intersecting the pivot axis "Y" of the pivot shaft 36 as shown in FIGS. 2 and 3.

The brake pedal return spring 40 is connected to the pivot member 38 by means of a lost-motion connection comprising a longitudinal slot 44, in such a manner that, in the normal or neutral position of the control lever 34, the hood end 41 of the spring 40 abuts against the inner end of said slot 44, as likewise shown in FIGS. 2 and 3.

The upper end of the control lever pivot shaft 36 extends through a control console 46 provided on the housing of the tractor 10 adjacent the steering wheel 13 and is therein provided with a pointer 48 adapted for pivotal rotation with the pivot shaft 36 upon manipulation of the control lever 34. The pointer 48 is adapted to align with a selected one of indicias 50 provided on the control console 46 to thereby indicate to the operator of the vehicle the respective drive position of the transmission 18.

The operation of the present improved, interconnected brake and direction control linkage is as follows: when the direction control lever 34 is in a neutral position and the brake pedal 22 in the unbraked position, there will be no tension on the return spring 40. In this position, which is shown in FIG. 2 and in solid lines in FIG. 3, the return spring 40 is in direct linear alignment with the central pivot axis "Y" of the control lever pivot shaft 36 and the end 41 of the spring is disposed in abutment against the inner rear surface of the slot 44 in the pivot member 38.

When the direction control lever 34 is moved to either the forward or reverse driving position, indicated by the indicias 50 on the control console 46, the pivot member 38, which is attached to the control lever pivot shaft 36, is rotated in the same direction as the control lever 34, thereby longitudinally pulling or pushing the link member 32 to reposition the direction positioning valve 28, due to the pivotal connection at 33 to the pivot member 38.

With particular reference to FIG. 3, when the control lever 34 is moved to the forward position indicated by the indicia "F" on the control console 46, the pivot member 38 is pivoted to he position 38a indicated in dot and dash lines in FIG. 3. This causes angular repositioning of the return spring 40 relative to the previous aligned position with the central pivot axis "Y"of the control lever pivot shaft 36, causing movement of the spring end 41 within the slot 44, however, in this position the spring 40 will not be subjected to a tension load.

If the operator now applies the brake, by depression of the foot pedal 22, the spring 40 is placed under tension, forcing the pivot member 38 in the opposite direction towards its initial neutral position due to the abutment of the spring which now abuts against the outer end of the slot 44 to thereby return the control lever 34 to the neutral position and, consequently, the direction positioning valve linkage 32. In this brake-applied position, the spring hook 41 at the end of the spring remains in the forward end of the slot 44 as long as the foot pedal 22 is depressed.

AS normally provided for, the neutral position of the control lever 34 may be locked in place by means of a spring detent or the like (not shown). Thus, as soon as the brake application is started by depression of the foot pedal 22 the control lever 34 is automatically forced into neutral, from either its forward drive position indicated by the numeral 38a in FIG. 3, or the reverse drive position indicated by the numeral 38b, to thereby positively prevent braking against engine power.

When starting the tractor 10, normally the brake will be released first, when the tractor is on level ground. However, if the tractor 10 is positioned or has stalled on an incline or is otherwise in a precarious position, the driving position may be engaged prior to the release of the brake by moving the control lever 34 in the required drive position, thus manually overriding the force of the spring 40 which tends to urge the pivot member 38 in aligned neutral position. Thus, tractive power may be supplied to the traction wheels 15 while the brakes of the vehicle are still applied, to prevent the vehicle from rolling away if the brakes were released prior to the application of tractive power to the traction wheels 15.

In the neutral position of the mechanism, when pressure is released from the brake pedal 22 the spring end 41 returns to the rear end of the slot 44, as in FIG. 2.

Thus, it will be seen from the foregoing description in connection with the attached drawings that the present invention provides an improved mechanism including means to interlock and overridingly couple the braking mechanism with the directional control mechanism of the vehicle. The present improved interconnecting mechanism assures that the brakes of the vehicle will not be applied while engine power is transmitted to the traction wheels, but which, on the other hand, provides that tractive power may be supplied after braking, when the brakes of the vehicle are still applied, as a safety measure to prevent the vehicle from running away, such as when the vehicle is disposed on an incline.

While the present invention has been shown and described in connection with a preferred embodiment, it will be obvious to a person skilled in the art that various changes in structure and arrangement and minor modifications may be made without departing from the spirit and essential characteristic of the invention as defined by the scope in the appended claims.

I claim:

1. In combination with a vehicle having a prime mover and traction wheels including brakes and a transmission operably connected between said prime mover and said traction wheels; a brake actuating mechanism connected to the brakes of said traction wheels and a manually operable direction selector control lever for said transmission pivotally mounted on said vehicle for movement between a forward and reverse drive position from a central neutral position; the improvement comprising: a pivot member mounted on said control lever for pivotal movement therewith; a link pivotally mounted on said pivot member and operably connected to said transmission for placement of said transmission in the respective drive position, corresponding to the selective position of said control lever; said brake mechanism including a brake rod connected to said brakes at said traction wheels and to a brake pedal; tension means connected between said brake pedal and said pivot member to normally retain said brake pedal in an inoperative position and normally disposed along an axis incidental with the neutral position of said control lever; and means permitting displacement of said tension means from said axis towards both sides thereof upon shifting of said control lever to the forward or reverse drive position without tensioning said tension means, whereby said tension means is operable to return to said axis incidental with the neutral position of said control lever when said tension means is tensioned by depression of said brake pedal while said control lever is in a selected drive position.

2. In the combination as defined in claim 1, said means permitting displacement of said tension means from said axis comprising a lost-motion connection.

3. In the combination as defined in claim 2, said control lever having a pivot shaft mounted for pivotal movement around an axis in said vehicle, and said pivot member comprising a bracket secured to said pivot shaft, said link being mounted on said bracket to one side of said pivot shaft and said tension means being mounted on said bracket forwardly of said pivot shaft along an axis normally intersecting the axis of said pivot shaft.

4. In the combination as defined in claim 3, said lost-motion connection comprising a slot in said bracket and the end of said tension means connected to said bracket being normally disposed in the rear end of said slot when said control lever is in a neutral position and the brake pedal is in inoperative position to thereby permit pivotal movement of said bracket with said pivot shaft when said control lever is shifted to a selective drive position without tensioning of said tension means.

5. In the combination as defined in claim 4, said tensioning means comprising a coil spring.

6. In a return-to-neutral control mechanism for use in a vehicle having a transmission and a brake actuating mechanism, said control mechanism comprising: a control lever having a shaft rotatably mounted in said vehicle for pivotal movement of said control lever around an axis between a first and a second drive position from a neutral central position; said pivot shaft having a bracket member mounted thereon for rotation therewith; a first linkage means connecting said bracket member with said transmission; said brake actuating mechanism comprising a brake rod operably connected to a brake pedal; elongatable second linkage means connecting said brake pedal with said bracket member and normally disposed along an axis intersecting the axis of said shaft when said control lever is in said neutral position; means comprising a lost-motion connection between said elongatable second linkage means and said bracket member to permit pivotal movement of said bracket member without elongating said second linkage means and displacing said axis from the intersecting position with said shaft axis; said lost-motion connection being taken up when said brake pedal is depressed to thereby elongate said second linkage means and return said control lever by means of connection to said bracket member to the neutral position from a selective drive position and into aligned intersecting position with said shaft axis.

7. In the control mechanism as defined in claim 6, said bracket member in cooperating relationship with said second linkage means and said lost-motion connection providing an override means to permit shifting of said control lever into a selective drive position when said brake pedal is depressed prior to release of said brake pedal.

8. In the control mechanism as defined in claim 7, said lost-motion connection comprising a slot in said bracket member and said second elongatable linkage means comprising an energy storing tension member having one end slidingly disposed in said slot normally in the rear end thereof when said control lever is in neutral and said brake pedal is in inoperative position; said one end being adapted to be displaced in said slot towards the front end thereof upon pivotal movement of said bracket member by shifting of said control lever in either first of second drive position to thereby permit loading of said energy storing tension member unless the brake pedal is depressed.

9. In the control mechanism as defined in claim 8, said energy storing tension member comprising a coil spring.

* * * * *